(12) United States Patent
Neuneier et al.

(10) Patent No.: US 6,728,691 B1
(45) Date of Patent: Apr. 27, 2004

(54) SYSTEM AND METHOD FOR TRAINING AND USING INTERCONNECTED COMPUTATION ELEMENTS TO DETERMINE A DYNAMIC RESPONSE ON WHICH A DYNAMIC PROCESS IS BASED

(75) Inventors: Ralf Neuneier, Munich (DE); Hans-Georg Zimmermann, Starnberg/Percha (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,850

(22) PCT Filed: Mar. 1, 2000

(86) PCT No.: PCT/DE00/00632

§ 371 (c)(1),
(2), (4) Date: Sep. 4, 2001

(87) PCT Pub. No.: WO00/55809

PCT Pub. Date: Sep. 21, 2000

(30) Foreign Application Priority Data

Mar. 3, 1999 (DE) .......................................... 199 09 359

(51) Int. Cl.$^7$ .............................................. G06F 15/18

(52) U.S. Cl. .......................................... 706/30; 706/14

(58) Field of Search ..................................... 706/30, 14

(56) References Cited

U.S. PATENT DOCUMENTS

| | | | |
|---|---|---|---|
| 5,761,386 A | 6/1998 | Lawrence et al. | 706/20 |
| 6,434,541 B1 * | 8/2002 | Tawel et al. | 706/30 |

OTHER PUBLICATIONS

Haykin et al, "Nonlinear Adaptive Prediction of Nonstationary Signals", IEEE Transactions on Signal Processing, Feb. 1995.*

Greco et al, "A Recurrent Time–Delay Neural Network for Improved Phoneme Recognition", IEEE International Conference on Acoustics, Speech, and Signal Processing, May 1991.*

(List continued on next page.)

*Primary Examiner*—George B. Davis
(74) *Attorney, Agent, or Firm*—Staas & Halsey LLP (57) ABSTRACT

Computation elements are connected to one another with a first subsystem having a first input computation element, to which time series values, which each describe one state of a system in a first state space at a time, can be supplied. The first input computation element is connected to a first intermediate computation element, by which a state of the system can be described in a second state space at a time. In a second subsystem a second intermediate computation element, by which a state of the system can be described in the second state space at a time, is connected to a first output computation element, on which a first output signal can be tapped off. In a third subsystem a third intermediate computation element, by which a state of the system can be described in the second state space at a time, is connected to a second output computation element, on which a second output signal can be tapped off. The first subsystem, the second subsystem and the third subsystem are each connected to one another by a coupling between the intermediate computation elements. Weights, which are each associated with one connection between two intermediate computation elements are equal to one another, and weights which are each associated with a connection between an intermediate computation element and an output computation element are equal to one another.

21 Claims, 5 Drawing Sheets

OTHER PUBLICATIONS

Rumelhart et al., "Parallel Distributed Processing: Explorations in the Microstructure of Cognition, vol. 1: Foundations", A Bradford Book, The MIT Press, Cambridge, Mass. 1987, pp. 354–360.

S. Hayken, "Neural Networks: A Comprehensive Foundation", McMillan College Publishing Company, Second Edition 1999, pp. 732–789.

S. Hayken, "Neural Networks: A Comprehensive Foundation," McMillan College Publishing Company 1994, pp. 498–533.

M. Hirahara et al., "A Neural Network Model for Visual Motion Detection that Can Explain Psychophysical and Neurophysiological Phenomena", vol. 68, No. 3, 1992, pp. 247–252.

E. W. Saad et al., "Comparative Study of Stock Trend Prediction Using Time Delay, Recurrent and Probabilistic Neural Networks", IEEE Transactions on Neural Networks, vol. 9, No. 6, Nov. 1998, pp. 1456–1470.

D. Wang et al., "Anticipation–Based Temporal Pattern Generation", IEEE Transactions on Systems, Man and Cybernetics, vol. 25, No. 4, Apr. 1, 1995.

C. Bishop, "Neural Networks for Pattern Recognition", 1995, pp. 302–205.

H. Rehkugler et al., "Neuronale netz in der Okonomie", Grundlagen und finanzwirtschaftliche Anwendungen, Verglag Franz Vahlen Munchen, ISBN 3–8006–1871–0, pp. 3–90, 1994.

* cited by examiner

SYSTEM AND METHOD FOR TRAINING AND USING INTERCONNECTED COMPUTATION ELEMENTS TO DETERMINE A DYNAMIC RESPONSE ON WHICH A DYNAMIC PROCESS IS BASED

BACKGROUND OF THE INVENTION

1. Field of the Invention

The invention relates to an arrangement of computation elements which are connected to one another to form a computer system, a method for computer-aided determination of a dynamic response on which a dynamic process is based, and a method for computer-aided training of an arrangement of computation elements which are connected to one another.

2. Description of the Related Art

Pages 732–789 of Neural Networks: a Comprehensive Foundation, Second Edition, by S. Hayken, published by MacMillan College Publishing Company in 1999 describes the use of an arrangement of computation elements which are connected to one another for determining a dynamic response on which a dynamic process is based.

Figure 2:
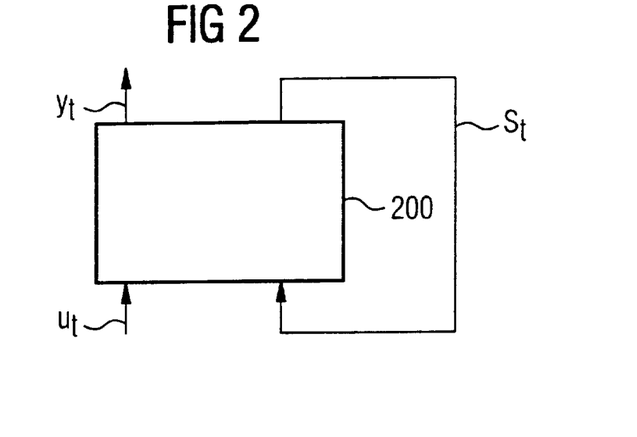
FIG. 2 is a block diagram of a general description of a dynamic system.

In general, a dynamic process is normally described by a state transition description, which is not visible to an observer of the dynamic process, and an output equation, which describes observable variables of the technical dynamic process. One such structure is shown in FIG. 2.

A dynamic system 200 is subject to the influence of an external input variable u whose dimension can be predetermined, with an input variable ut at a time t being annotated ut:

$$u_t \in \Re^l,$$

where l denotes a natural number.

The input variable $u_t$ at a time t causes a change in the dynamic process taking place in the dynamic system 200.

An inner state $s_t$ ($s_t \in \Re^m$) whose dimension m at a time t can be predetermined, cannot be observed by an observer of the dynamic system 200.

Depending on the inner state $s_t$ and the input variable $u_t$, a state transition is caused in the inner state $s_t$ of the dynamic process, and the state of the dynamic process changes to a subsequent state $s_{t+1}$ at a subsequent time t+1.

In this case:

$$s_{t+1} = f(s_t, u_t). \tag{1}$$

where f( ) denotes a general mapping rule.

An output variable $y_t$ to time t, which can be observed by an observer of the dynamic system 200, depends on the input variable $u_t$ and on the inner state $s_t$.

The output variable $Y_t$ ($Y_t \in \Re^n$) has a dimension n which can be predetermined.

The dependency of the output variable $y_t$ on the input variable $u_t$ and on the inner state $s_t$ of the dynamic process is expressed by the following general rule:

$$y_t = g(s_t, u_t), \tag{2}$$

where g(.) denotes a general mapping rule.

In order to describe the dynamic system 200, S. Hayken describes using an arrangement of computation elements, which are connected to one another, in the form of a neural network of neurons which are connected to one another. The connections between the neurons in the neural network are weighted. The weights in the neural network are combined in a parameter vector v.

An inner state of a dynamic system which is subject to a dynamic process is thus, in accordance with the following rule, dependent on the input variable $u_t$ and the inner state at the previous time st, and the parameter vector v:

$$s_{t+1} = NN(v, s_t, u_t), \tag{3}$$

where NN( ) denotes a mapping rule which is predetermined by the neural network.

An arrangement of computation elements which is referred to as a Time Delay Recurrent Neural Network (TDRNN) is described in David E. Rumelhart et al., Parallel Distributed Processing, Explorations in the Microstructure of Cognition, Vol. 1: Foundations, A Bradford Book, The MIT Press, Cambridge, Mass., London, England, 1987. The known TDRNN is illustrated in FIG. 5 as a neural network 500 which is convoluted over a finite number of times (the illustration shows 5·times, t–4, t–3, t–2, t–1, t).

Figure 5:
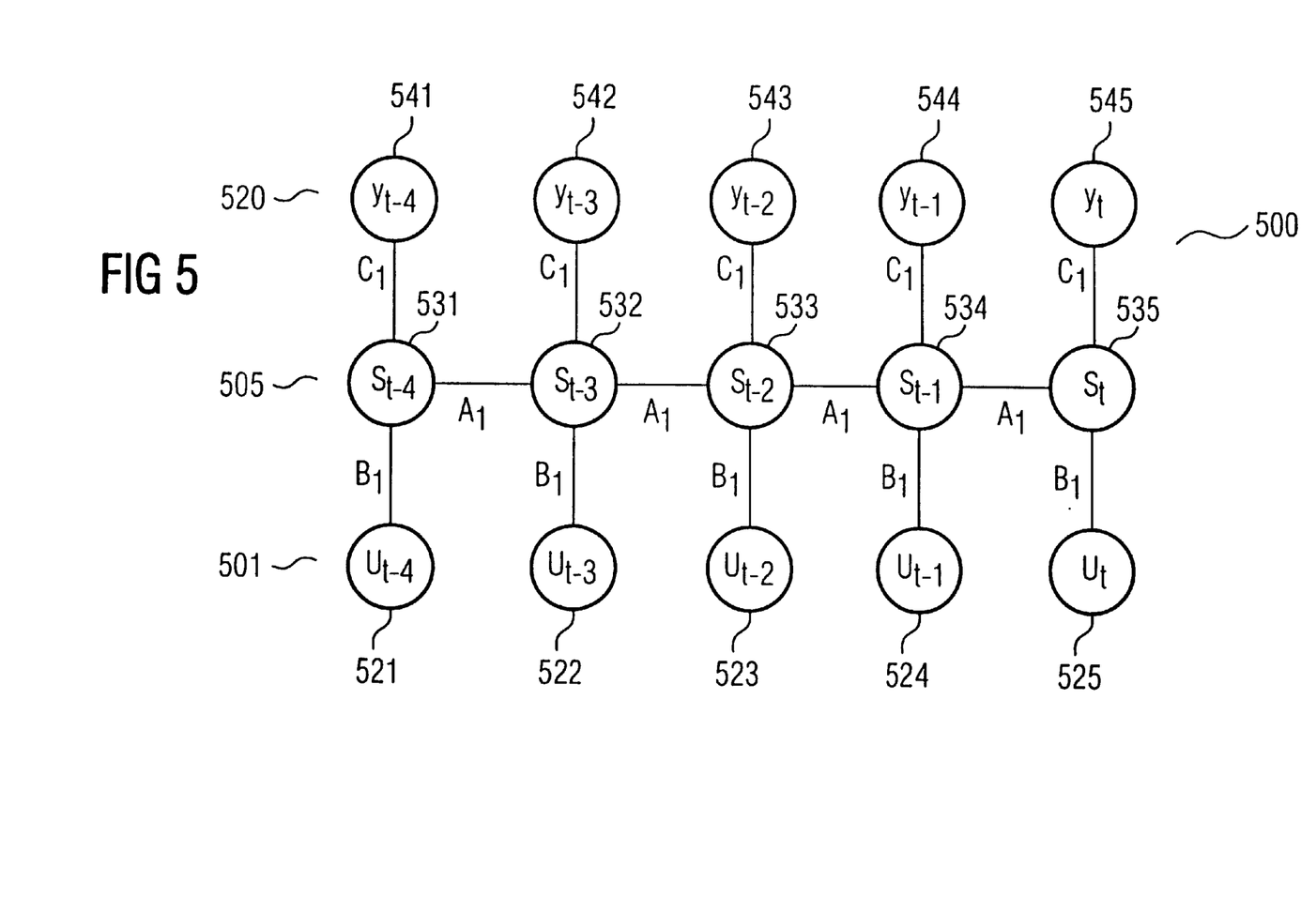
FIG. 5 is a block diagram of a system of a TDRNN, which is convoluted with a finite number of states with respect to time.

The neural network 500 which is illustrated in FIG. 5 has an input layer 501 with five partial input layers 521, 522, 523, 524 and 525, which each contain a number (which can be predetermined) of input computation elements, to which input variables $u_{t-4}, u_{t-3}, u_{t-2}, u_{t-1}$ and $u_t$ can be applied at times t–4, t–3, t–2, t–1 and t which can be predetermined, that is to say time series values, which are described in the following text, with predetermined time steps.

Input computation elements, that is to say input neurons, are connected via variable connections to neurons in a number (which can be predetermined) of concealed layers 505 (the illustration shows 5 concealed layers). In this case, neurons in a first 531, a second 532, a third 533, a fourth 534 and a fifth 535 concealed layer are respectively connected to neurons in the first 521, the second 522, the third 523, the fourth 524 and the fifth 525 partial input layer.

The connections between the first 531, the second 532, the third 533, the fourth 534 and the fifth 535 concealed layer and, respectively, the first 521, the second 522, the third 523, the fourth 524 and the fifth 525 partial input layers are each the same. The weights of all the connections are each contained in a first connection matrix $B_1$.

Furthermore, the neurons in the first concealed layer 531 are connected from their outputs to inputs of neurons in the second concealed layer 532, in accordance with a structure which is governed by a second connection matrix $A_1$. The neurons in the second concealed layer 532 are connected by their outputs to inputs of neurons in the third concealed layer 533 in accordance with a structure which is governed by the second connection matrix $A_1$. The neurons in the third concealed layer 533 are connected by their outputs to inputs of neurons in the fourth concealed layer 534 in accordance with a structure which is governed by the second connection matrix $A_1$. The neurons in the fourth concealed layer 534 are connected by their outputs to inputs of neurons in the fifth concealed layer 535 in accordance with a structure which is governed by the second connection matrix $A_1$.

Respective "inner" states or "inner" system states $s_{t-4}, s_{t-3}, s_{t-2}, s_{t-1}$, and $s_t$ of a dynamic process which is described by the TDRNN are represented at five successive times t–4, t–3, t–2, t–1 and t in the concealed layers, the first concealed layer 531, the second concealed layer 532, the third concealed layer 533, the fourth concealed layer 534 and the fifth concealed layer 535.

The details in the indices in the respective layers each indicate the time t–4, t–3, t–2, t–1 and t to which the signals ($u_{t-4}, u_{t-3}, u_{t-2}, u_{t-1}, u_t$) which can in each case be tapped off from or supplied to the outputs of the respective layer relate.

One output layer 520 has five partial output layers, a first partial output layer 541, a second partial output layer 542, a third partial output layer 543, a fourth partial output layer 544 and a fifth output layer 545. Neurons in the first partial output layer 541 are connected to neurons in the first concealed layer 531 in accordance with a structure which is governed by an output connection matrix $C_1$. Neurons in the second partial output layer 542 are likewise connected to neurons in the second concealed layer 532 in accordance with the structure which is governed by the output connection matrix $C_1$. Neurons in the third partial output layer 543 are connected to neurons in the third concealed layer 533 in accordance with the output connection matrix $C_1$. Neurons in the fourth partial output layer 544 are connected to neurons in the fourth concealed layer 534 in accordance with the output connection matrix $C_1$. Neurons in the fifth partial output layer 545 are connected to neurons in the fifth concealed layer 535 in accordance with the output connection matrix $C_1$. The output variables for a respective time t-4, t-3, t-2, t-1, t can be tapped off $(y_{t-4}, Y_{t-3}, Y_{t-2}, y_{t-}, y_t)$ on the neurons in the partial output layers 541, 542, 543, 544 and 545.

The principle that equivalent connection matrices in a neural network have the same values at a respective time is referred to as the principle of shared weights. The arrangement of computation elements which is known from Rumelhart et al. and is referred to as a Time Delay Recurrent Neural Network (TDRNN) is trained in a training phase in such a manner that a target variable $y_t^d$ relating to an input variable $u_t$ is in each case determined on a real dynamic system. The tuple (input variable, determined target variable) is referred to as a training data item. A large number of such training data items form a training data set.

In this case, tuples $(u_{t-4}, Y_{t-4}^d) (u_{t-3}, y_{t-3}^d), (u_{t-2}, y_{t-2}^d)$ which follow one another in time at the times (t-4, t-3, t-3, ...) in the training data set each have a predefined time step.

The TDRNN is trained using the trained data set, and S. Hayken provides a summary of the various training methods.

At this point, it should be stressed that only the output variables $(Y_{t-4}, Y_{t-3}, \ldots, Y_t)$ at the times (t-4, t-3, ..., t) can be identified in the dynamic system 200. The "inner" system states $(s_{t-4}, s_{t-3}, \ldots, s_t)$ cannot be observed.

The following cost function E is normally minimized in the training phase:

$$E = \frac{1}{T}\sum_{t=1}^{T}(y_t - y_t^d)^2 \to \min_{f,g}, \quad (4)$$

where T denotes a number of times being considered.

Furthermore, pages 3–90 of Neuronale Netze in der Ökonomie, Grundlagen and finanzwirtschaftliche Anwendungen, (Neural Networks in Economics, Principles and Financial Applications) by H. Rehkugler and H. G. Zimmermann, published by Verlag Franz Vahlen Munich in 1994, contains a summary of the principles of neural networks and the application options for neural networks in the economics field.

The known systems and methods have the particular disadvantage that they can be used only to describe the current state of a process for an input variable ut at a current time t or for an input variable $u_{t-1}$ at a time t-1 which preceded the present time by a predetermined time step. A future subsequent state of the process which follows after a time step which can be predetermined, or future subsequent states of the process, which each follow one another after a time step which can be predetermined cannot be described or predicted, respectively, in most cases.

SUMMARY OF THE INVENTION

The invention is thus based on the problem of specifying an arrangement of computation elements which are connected to one another, by which future subsequent states which follow one another in time in a dynamic process can be described, and which arrangement is not subject to the disadvantages of the known systems.

Furthermore, the invention is based on the problem of specifying a method for computer-aided determination of a dynamic response, on which a dynamic process is based, by which future subsequent states in a dynamic process, which follow one another in time, can be described.

An arrangement of computation elements which are connected to one another according to the invention has the following features. The arrangement includes at least one first subsystem with a first input computation element, to which time series values, which each describe one state of a system in a first state space, can be supplied, and with a first intermediate computation element, by which a state of the system can be described in a second state space, with the first input computation element and the first intermediate computation element being connected to one another. The arrangement includes at least one second subsystem with an associated second intermediate computation element, by which a state of the system can be described in the second state space, and with an associated first output computation element, on which a first output signal, which describes a state of the dynamic system in the first state space, can be tapped off, with the second intermediate computation element and the first output computation element being connected to one another. The arrangement includes at least one third subsystem with an associated third intermediate computation element, by which a state of the system can be described in the second state space, and with an associated second output computation element, on which a second output signal, which describes a state of the dynamic system in the first state space, can be tapped off, with the third intermediate computation element and the second output computation element being connected to one another, the first subsystem, the second subsystem and the third subsystem are each connected to one another by a coupling between the associated intermediate computation elements, weights, which are each associated with one connection between two intermediate computation elements, are equal to one another, and weights which are each associated with a connection between an intermediate computation element and an output computation element are equal to one another.

The following steps are carried out in a method for computer-aided determination of a dynamic response on which a dynamic process is based: a) the dynamic process is described by a time series with time series values in a first state space, with at least one first time series value describing a state of the dynamic process at a first time, and a second time series value describing a state of the dynamic process at a second time, b) the first time series value being transformed to a second state space, c) the first time series value in the second state space being subjected to mapping onto a second time series value in the second state space, d) the second time series value in the second state space being subjected to mapping onto a third time series value in the second state space, e) the second time series value in the second state space and the third time series value in the second state space each being transformed back to the first state space, and f) the dynamic response of the dynamic process being determined using the time series values in the second state space.

In a method for computer-aided determination of a dynamic response on which a dynamic process is based, which method is carried out using an arrangement of computation elements which are connected to one another, with the arrangement having the following construction: if there is at least one first subsystem, an associated first input computation element, to which an input signal which describes a state of the dynamic system in a first state space can be supplied, and an associated first intermediate computation element, by which a state of the dynamic process can be described in a second state space, are connected to one another, if there is at least one second subsystem, an associated second intermediate computation element, by which a state of the dynamic process can be described in the second state space, and an associated first output computation element on which a first output signal, which describes a state of the dynamic process in the first state space, can be tapped off are connected to one another, if there is at least one third subsystem, an associated third intermediate computation element, by which a state of the dynamic process can be described in the second state space, and an associated second output computation element, on which a second output signal which describes a state of the dynamic process in the first state space at a time, can be tapped off are connected to one another, the first subsystem, the second subsystem and the third subsystem are each connected to one another by means of a coupling between the associated intermediate computation elements, weights which are each associated with a connection between two intermediate computation elements are defined in such a manner that the weights are equal to one another, weights which are each associated with a connection between an intermediate computation element and an output computation element are defined in such a manner that the weights are equal to one another, the input signal is supplied to the arrangement. The arrangement determines the first output signal and the second output signal. The dynamic response is determined using the first output signal and the second output signal.

In a method for computer-aided training of an arrangement of computation elements which are connected to one another, having the following components: if there is at least one first subsystem, an associated first input computation element, to which an input signal which describes a state of a system in a first state space can be supplied, and an associated first intermediate computation element, by means of which a state of the system can be described in a second state space, are connected to one another, if there is at least one second subsystem, an associated second intermediate computation element, by means of which a state of the system can be described in the second state space, and an associated first output computation element on which a first output signal, which describes a state of the system in the first state space, can be tapped off are connected to one another, if there is at least one third subsystem, an associated third intermediate computation element, by means of which a state of the system can be described in the second state space, and an associated second output computation element, on which a second output signal which describes a state of the system in the first state space, can be tapped off are connected to one another, the first subsystem, the second subsystem and the third subsystem are each connected to one another by means of a coupling between the associated intermediate computation elements, weights which are each associated with a connection between two intermediate computation elements are defined in such a manner that the weights are equal to one another, weights which are each associated with a connection between an intermediate computation element and an output computation element are defined in such a manner that the weights are equal to one another, the arrangement is trained using predetermined training data which are applied to the first input computation element as the input signal, in such a manner that error values are found only in those subsystems which represents states of the dynamic system whose times each correspond to a time of a training data item.

The arrangement is particularly suitable for carrying out the method according to the invention, or one of their developments explained in the following text.

A number of subsequent states, of a dynamic process, which each follow one another by a time step which can be predetermined, can now be predicted using the invention. This allows states of the dynamic process to be predicted over long time period. Such determination of future states of the dynamic process is referred to as overshooting.

In this way, the invention can be used for carrying out first cause analysis, for determining early warning indicators, and for the purposes of an early warning system. This means that the invention can be used for a dynamic process to determine those indicators or process states which at the present time already indicate undesirable process states which will follow the present time after a long time interval. A first cause of an undesirable development in the dynamic process can thus be identified at an early stage, with a remedial measure thus being initiated.

The invention means, in particular, that states at a previous time are taken into account with less weighting in the determination of the dynamic response on which the dynamic process is based than states which have occurred at a more recent time.

Furthermore, the invention has the advantage that the training of the arrangement according to the invention and the training method according to the invention require less training data than known systems and methods, so that more efficient learning is possible. This is feasible in particular due to a particular selection and arrangement or structure of the computation elements used in the arrangement according to the invention.

A number of first, second and/or third subsystems are preferably used in each case.

One development includes at least one fourth subsystem having an associated fourth intermediate computation element, by means of which a state of the system can be described in the second state space, and having an associated second input computation element. The associated fourth intermediate computation element and the associated second input computation element, to which further time series values, which each describe a further state of the system in the first state space, can be supplied, are connected to one another. The fourth subsystem is coupled to the first subsystem by means of a coupling between the associated fourth intermediate computation element and the first intermediate computation element. In the development, weights which are each associated with a connection between an input computation element and an intermediate computation element are equal to one another.

A number of fourth subsystems are preferably used.

Simple output signals can be tapped off on an output computation element when one output computation element is connected to a number of intermediate computation elements.

In one preferred refinement, the first, the second and the third subsystems respectively represent the system at a first a second and a third time, with the first, the second and the third time each being successive times and there being a first time interval between the first time and the second time, which has a first time step which can be predetermined, and there being a second time interval between the second and the third time, which has a second time step which can be predetermined.

For long-term prognosis, it is advantageous for the first subsystem to represent a current state of the system, for the second subsystem to represent a future first state of the system, shifted through the first time step which can be predetermined, and for the third subsystem to represent a future second state of the system, shifted through the second time step which can be predetermined.

The first time step which can be predetermined and the second time step which can be predetermined are preferably equal to one another.

In a development, the second time step which can be predetermined is a multiple of the first time step which can be predetermined.

In order to determine intermediate states of the system, it is advantageous for the first and/or the second time step(s) to be defined in such a manner that the first and/or the second time step(s) which can be predetermined are/is a devisor of a further predetermined time step, which is governed by a time series which is formed by the time series values.

In one refinement, the fourth subsystem represents the system at a fourth time, with there being a third time interval, which has a third time step which can be predetermined, between the fourth time and the first time. The fourth subsystem preferably represents the system at a previous time.

A dynamic response can be determined easily, particularly if at least some of the computation elements are artificial neurons.

Furthermore, from the computation point of view, it is particularly advantageous if, in one refinement, only one weight of weights which are in each case associated with a connection between an intermediate computation element and an output computation element has the value unity, and the other weights of the weights each have the value zero.

A development for determining a dynamic response of a dynamic process is preferably used.

One refinement has a measurement system for detecting physical signals, by means of which the dynamic process is described.

A development for determining the dynamic response of a dynamic process which takes place in a technical system, in particular in a chemical reactor, or for determining the dynamic response of an electrocardiogram (EKG), or for determining economic or macroeconomic dynamic responses is preferable used.

One development can also be used for monitoring or controlling the dynamic process, in particular a chemical process and one in which time series values can be determined from physical signals.

BRIEF DESCRIPTION OF THE DRAWINGS

Exemplary embodiments of the invention will be explained in more detail in the following text and are illustrated in the figures, in which.

DETAILED DESCRIPTION OF THE PREFERRED EMBODIMENTS

First Exemplary Embodiment: Chemical Reactor

Figure 4:
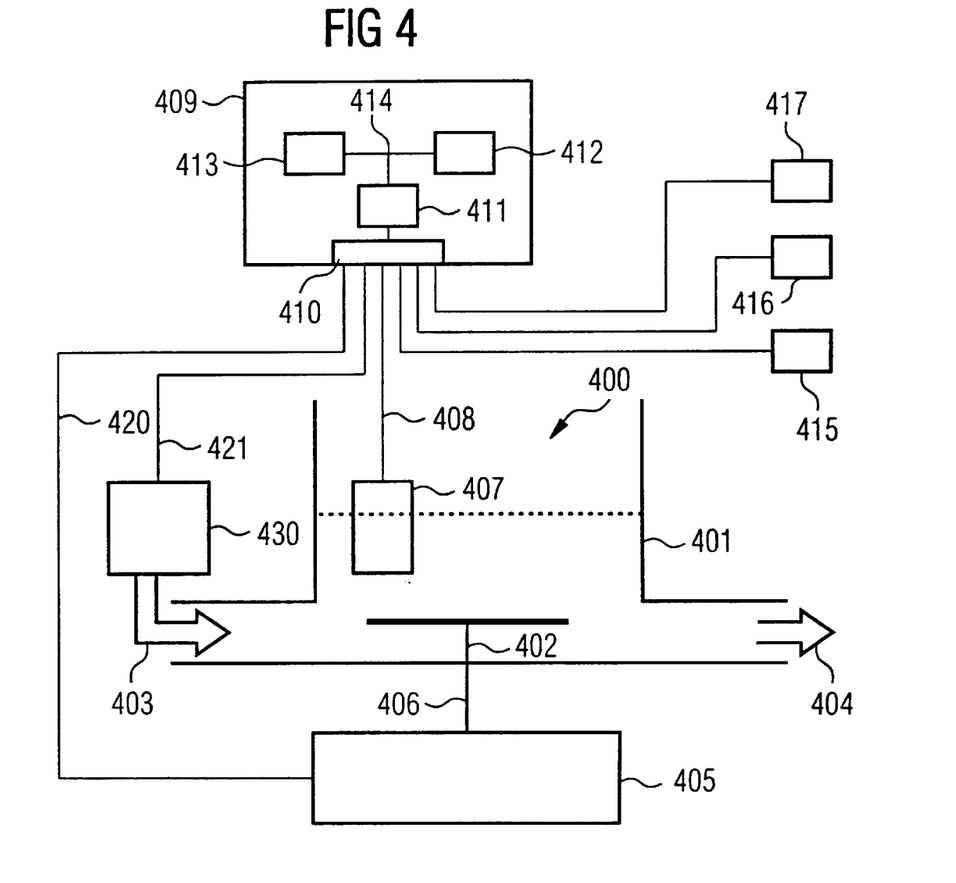
FIG. 4 is a block diagram of a chemical reactor, from which variables are measured which are further processed using the first exemplary embodiment of the arrangement.

FIG. 4 is a block diagram of a chemical reactor 400 which is filled with a chemical substance 401. The chemical reactor 400 includes a stirrer 402, which is used to stir the chemical substance 401. Further chemical substances 403 flowing into the chemical reactor 400 react during a predetermined time period in the chemical reactor 400 with the chemical substance 401 that the chemical reactor 400 already contains. A substance 404 flowing out of the reactor 400 is passed out of the chemical reactor 400 via an output.

The stirrer 402 is connected via a line to a control unit 405, by means of which a stirring frequency of the stirrer 402 can be adjusted via a control signal 406.

Furthermore, a measurement device 407 is provided, by means of which concentrations of chemicals contained in the chemical substance 401 are measured. Measurement signals 408 are supplied to a computer 409, are digitized in the computer 409 via an input/output interface 410 and an analog/digital converter 411, and are stored in a memory 412. In the same way as the memory 412, a processor 413 is connected to the analog/digital converter 411 via a bus 414. The computer 409 is also connected via the input/output interface 410 to the controller 405 for the stirrer 402, and the computer 409 thus controls the stirring frequency of the stirrer 402. The computer 409 is also connected via the input/output interface 410 to a keyboard 415, to a computer mouse 416 and to a screen 417.

The chemical reactor 400 is thus subject to a dynamic process, as a dynamic technical system 200. The chemical reactor 400 is described by means of a state description. The input variable ut is in this case composed of details of the temperature in the chemical reactor 400, of the pressure in the chemical reactor 400, and of the stirring frequency to be set at the time t. The input variable is thus a three-dimensional vector.

The aim of the modeling of the chemical reactor 400 as described in the following text is to determine the dynamic development of the substance concentrations in order thus to allow efficient production of an intended material, which can be predetermined and is to be produced, as the substance 404 flowing out. This is done using the system described in the following text and illustrated in FIG. 1a and FIG. 1b.

Figure 1A:
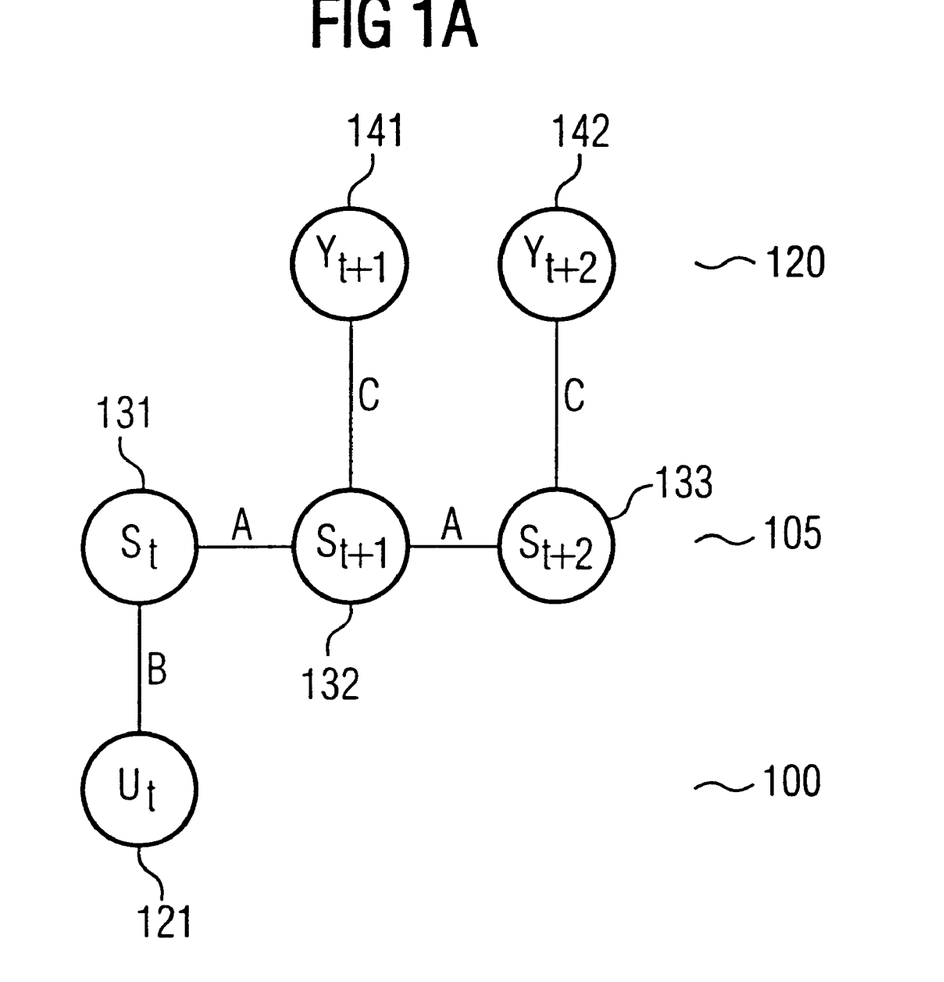
FIGS. 1a and 1b are block diagrams of a basic structure, and a first exemplary embodiment of a system according to the invention.
Figure 1B:
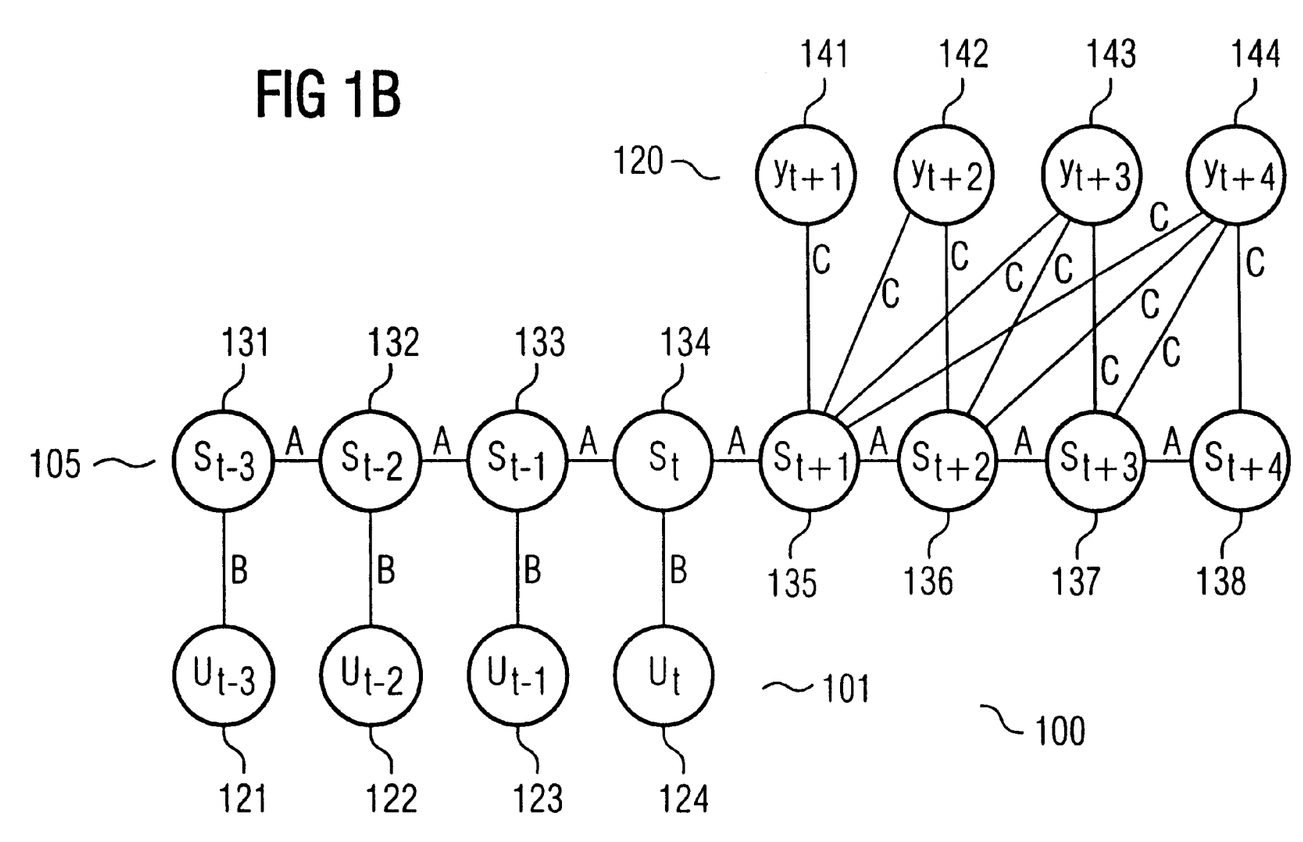

To assist understanding of the principles on which the system is based, FIG. 1a shows a base structure of the system. The system illustrated in FIG. 1b is formed on the basis of this basic structure.

FIG. 1a shows the basic structure of the system, which is a neural network 100 convoluting over three times t, t+1, t+2. The neural network 100 illustrated in FIG. 1a has an input layer 121, which includes a number, which can be predetermined, of input neurons, to which input variables $u_t$ can be applied at times t, which can be predetermined, that is to say time series values which are described in the following text and have predetermined time steps.

The input neurons are connected via variable connections to neurons in a number, which can be predetermined, of concealed layers 105 (the illustration shows 3 concealed layers). In this case, neurons in a first concealed layer 131 are connected to neurons in the first input layer 121. The connection between the first concealed layer 131 and the second input layer 121 has weights, which are contained in a first connection matrix B.

Furthermore, the neurons in the first concealed layer 131 are connected by means of their outputs to inputs of neurons in a second concealed layer 132, in accordance with a structure which is governed by a second connection matrix A. The neurons in the second concealed layer 132 are connected by means of their outputs to inputs of neurons in a third concealed layer 133 in accordance with a structure which is governed by the second connection matrix A. "Inner" states or "inner" system states $s_t$, $s_{t+1}$ and $s_{t+2}$ of the described dynamic process are each represented at three successive times t, t+1 and t+2 in the concealed layers, the first concealed layer 131, the second concealed layer 132, and the third concealed layer 133. Details in the indices in the respective layers indicate the respective time t, t+1, t+2 to which the respective signals ($u_t$) which can be tapped off at or can be supplied to the outputs of the respective layer relate.

One output layer 120 has two partial output layers, a first partial output layer 141 and a second partial output layer 142. Neurons in the first partial output layer 141 are connected to neurons in the first concealed layer 131 in accordance with a structure which is governed by an output connection matrix C. Neurons in the second partial output layer 142 are likewise connected to neurons in the second concealed layer 132 in accordance with the structure which is governed by the output connection matrix C. The output variables for a respective time t+1, t+2 can be tapped off ($y_{t+1}$, $Y_{t+2}$) at the neurons in the partial output layers 141 and 142. The fundamental principle that equivalent connection matrices in a neural network have the same values at any given time is referred to as the principle of shared weights.

The system illustrated in FIG. 1b will be explained in the following text based on the principle of shared weights and based on the basic structure. The sketches described in the following text should in each case be understood as indicating that each layer and each sublayer has a number of neurons, that is to say computation elements, which can be predetermined. The respective connection matrices have any dimension, as required, and each contain weight values relating to the corresponding connections between the neurons in the respective layers. However, it is particularly important that the output connection matrix C is defined in such a manner that one weight in the output connection matrix C has the value unity, while the other weights in the output connection matrix C have the value zero.

The system 100 illustrated in FIG. 1b has an input layer 101 with four partial input layers 121, 122, 123 and 124, which each contain a number, which can be predetermined, of input computation elements to which input variables $u_{t-3}$, $u_{t-2}$, $u_{t-1}$ and $u_t$ can be applied at times t-3, t-2, t-1 and t, which can be predetermined, that is to say time series values which are descried in the following text with predetermined time steps.

In order that such a large number of dynamic process states at previous times can be taken into account by the respective input variables, the system has what is referred to as a long-term memory.

Input computation elements, that is to say input neurons, are connected via variable connections to neurons in a number, which can be predetermined, of concealed layers 105 (the illustration shows 8 concealed layers). In this case, neurons in a first 131, a second 132, a third 133 and a fourth 134 concealed layer are respectively connected to neurons in the first 121, the second 122, the third 123 and the fourth 124 partial input layer.

The connections between the first 131, the second 132, the third 133 and the fourth 134 concealed layer and the respective first 121, the second 122, the third 123 and the fourth 124 partial input layers are in each case the same. The weights of all the connections are all included in a first connection matrix B.

Furthermore, the neurons in the first concealed layer 131 are connected by means of their outputs to inputs of neurons in the second concealed layer 132 in accordance with a structure which is governed by a second connection matrix A. The neurons in the second concealed layer 132 are connected by means of their outputs to inputs of neurons in the third concealed layer 133 in accordance with a structure which is governed by the second connection matrix A. The neurons in the third concealed layer 133 are connected by means of their outputs to inputs of neurons in the fourth concealed layer 134 in accordance with a structure which is governed by the second connection matrix A. The neurons in the fourth concealed layer 134 are connected by means of their outputs to inputs of neurons in a fifth concealed layer 135 in accordance with a structure which is governed by the second connection matrix A. The neurons in the fifth concealed layer 135 are connected by means of their outputs to inputs of neurons in a sixth concealed layer 136 in accordance with a structure which is governed by the second connection matrix A. The neurons in the sixth concealed layer 136 are connected by means of their outputs to inputs of neurons in a seventh concealed layer 137 in accordance with a structure which is governed by the second connection matrix A. The neurons in the seventh concealed layer 137 are connected by means of their outputs to inputs of neurons in an eighth concealed layer 138 in accordance with a structure which is governed by the second connection matrix A.

Respective "inner" states or "inner" system states $s_{t-3}$, $s_{t-2}$, $s_{t-1}$, $s_{t+1}$ $s_{t+2}$, $s_{t+3}$ and $s_{t+4}$ of a dynamic process which is described by the system are represented at eight successive times t-3, t-2, t-1, t, t+1, t+2, t+3 and t+4 in the concealed layers, the first concealed layer 131, the second concealed layer 132, the third concealed layer 133, the fourth concealed layer 134, the fifth concealed layer 135, the sixth concealed layer 136, the seventh concealed layer 137 and the eighth concealed layer 538.

The details in the indices in the respective layers indicate the respective time t-3, t-2, t-1, t, t+1, t+2, t+3 and t+4 to which the signals ($u_{t-3}$, $u_{t-2}$, $u_{t-1}$, $u_t$, $u_{t+}$, $u_{t+2}$, $u_{t+3}$, $u_{t+4}$) winch can be tapped off at or supplied to the outputs of the respective layer in each case relate.

One output layer 120 has four partial output layers, a first partial output layer 141, a second partial output layer 142, a third partial output layer 143 and a fourth partial output layer 144. Neurons in the first partial output layer 141 are connected to neurons in the fifth concealed layer 135 in accordance with a structure which is governed by an output connection matrix C. Neurons in the second partial output layer 142 are likewise respectively connected to neurons in the fifth concealed layer 135 and to neurons in the sixth concealed layer 136 in accordance with the structure which is governed by the output connection matrix C.

Neurons in the third partial output layer 143 are respectively connected to neurons in the fifth concealed layer 135, to neurons in the sixth concealed layer 136 and to neurons in the seventh concealed layer 137 in accordance with the output connection matrix C.

Neurons in the fourth partial output layer 144 are respectively connected to neurons in the fifth concealed layer 135, to neurons in the sixth concealed layer 136, to neurons in the seventh concealed layer 137 and to neurons in the eighth concealed layer 138 in accordance with the output connection matrix C.

The output variables for a respective time t+1, t+2, t+3, and t+4 can be tapped off $(y_{t+1}, y_{t+2}, y_{t+3}, y_{t+4})$ at the neurons in the partial output layers 141, 142, 143 and 144. It is thus possible to predict four subsequent states of the dynamic process which each follow one another with a time step which can be predetermined, and hence to predict states of the dynamic process over a lengthy time period (overshooting). The output connection matrix C is defined in such a manner that one weight in the output connection matrix has the value unity, while the other weights in the output connection matrix C have the value zero.

The particular advantage that the system illustrated in FIG. 1b has, in particular, by virtue of its structure is that the system allows efficient training using only a small amount of training data. This is feasible, in particular, since the respective equal weights in the connection matrices A, B and C mean that only a small number of weight parameters need be set, and the particular shape of the output connection matrix C results in a further simplification of the training method.

A further significant advantage which the system has is that the only input and output neuron layers which are used are those to which or at which significant information for describing the dynamic response of the dynamic process is applied or tapped off.

A method based on a back-propagation process, as is described in S. Hayken, is used for training the system described above. In the method known from S. Hayken, the following cost function E is minimized in the training phase:

$$E = \frac{1}{T}\sum_{t=1}^{T}(y_t - y_t^d)^2 \to \min_{f,g} \quad (4)$$

where T denotes the number of times considered.

In order to train the system described above using an overall cost function E', which is described in the following text, a cost function F is added to the cost function E.

The system is thus trained in such a manner that, when the dynamic response is modeled by the trained system, a predetermined condition, such as a smoothed profile of the dynamic process in a predetermined area, is considered, in which "inner" states of the described dynamic process are represented.

Using the cost function F for measuring any curvature of a trajectory which can be described in a state space S in which the "inner" system states $s_{t-3}$, $s_{t-2}$, $s_{t-1}$, $s_t$, $s_{t+1}$, $s_{t+2}$, $s_{t+3}$, and $s_{t+4}$ are described, and with the cost function F being formed in accordance with the following rule:

$$F = \frac{1}{T}\sum_{t=1}^{T}\frac{(s_{t+1} - 2s_t + s_{t-1})^2}{(s_{t+1} - s_t)^2 + (s_t - s_{t-1})^2}, \quad (5)$$

the overall cost function E' is formed, using which the neural network is trained with a training data set obtained by measuring variables in the chemical reactor 400, with the overall cost function E' being formed in accordance with the following rule:

$$E' = \frac{1}{T}\sum_{t=1}^{T}(y_t - y_t^d)^2 + \frac{(s_{t+1} - 2s_t + s_{t-1})^2}{(s_{t+1} - s_t)^2 + (s_t - s_{t-1})^2} \to \min_{f,g}. \quad (6)$$

The back-propagation process is used as the training method. The training data set is obtained from the chemical reactor 400 in the following manner.

Concentrations for predetermined input variables are measured using the measurement device 407 and are supplied to the computer 409, where they are digitized and are grouped as time series values $x_t$ in a memory together with the corresponding input variables, which correspond to the measured variables.

The system in FIG. 1b is trained using the training data set and the overall cost function. The system in FIG. 1b, trained in accordance with the training method described above, is used to determine chemical variables in the chemical reactor 400, in such a manner that predicted variables $x_{t+1}$, $x_{t+2}$, $x_{t+3}$, and $x_{t+4}$ are determined in an application phase of the system for an input variable at a time t−1 and an input variable at a time t, and are then supplied, after any preprocessing of the determined variables that is required, as control variables 420, 421 to the control means 405 for controlling the stirrer 402, or else are supplied to an inlet-flow control device 430 for controlling the inlet-flow of further chemical substances 403 into the chemical reactor 400 (cf. FIG. 4).

The system and the training of the system furthermore result in a trajectory, which is determined in a state space and is subject to noise, not being suitable for useable determination of a dynamic response on which the process is based when using a normal method and scaling resulting from this.

The capability to take account of a smoothness condition over a wider area now results in a dynamic response along a different scaling in the state space, in such a manner that the profile of the trajectory is smoother, and the noise is no longer a significant factor impeding determination of the dynamic response.

2. Exemplary Embodiment: Rental Price Prediction

Figure 3:
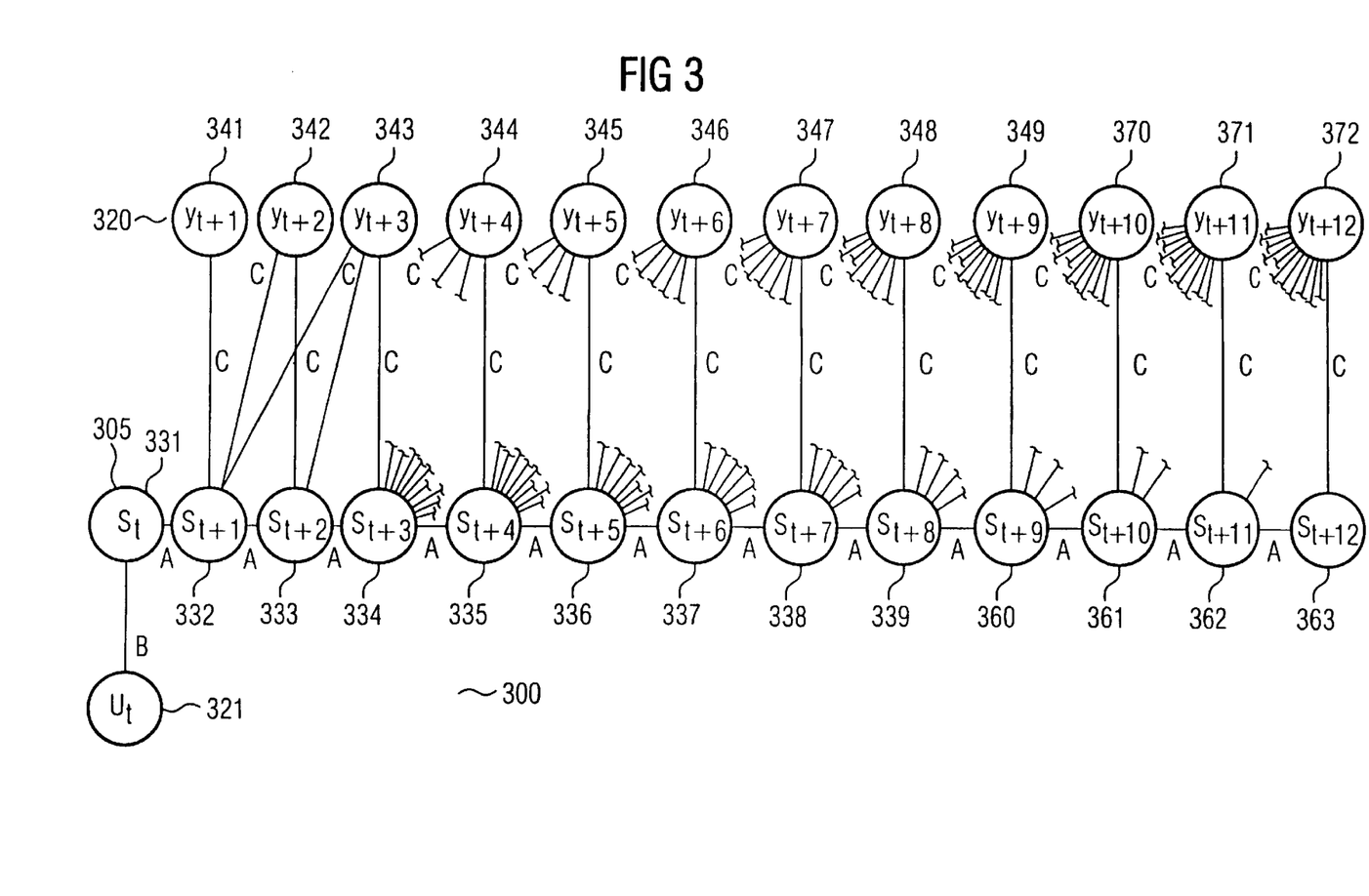
FIG. 3 is a block diagram of a second exemplary embodiment of a system in which intermediate states of a dynamic process are determined.

In the system illustrated in FIG. 3 intermediate states in a dynamic response on which a dynamic process is based, and intermediate states of the dynamic process, can be determined. An intermediate state of a dynamic response means a state which follows a current state of the dynamic process shifted by a time step which can be predetermined, with the time step which can be predetermined being a devisor of a time step which is predetermined by a time series formed by input variables. Such determination of intermediate states for a dynamic process is referred to as undershooting.

The system illustrated in FIG. 3 is used for rental price prediction. The input variable ut is in this case composed of details relating to a rental price, available housing, inflation and unemployment rate, which details are in each case determined at the end of the year (December values) for a residential area that is to be investigated. The input variable is thus a four-dimensional vector. A time series of input variables which comprise a number of vectors following one another in time has time steps of one year in each case.

The aim of the modeling of the formation of a rental price as described in the following text is to predict a rental price for the following three years from a current time, with the rental price in each case being determined for a three-monthly time step (in each case for the 1st, 2nd, 3rd and 4th quarter of the first, second and third years) (undershooting). In this case, the state of the dynamic process of forming a rental price in each case represents an intermediate state for the 1st, 2nd and 3rd quarter of the first, second and third years. The states which the dynamic process in each case has for the fourth quarter of the first, second and third years in each case use a time step corresponding to the same time step as the time series of the input variables.

The dynamic process for forming a rental price will be described using the system described in the following text and illustrated in FIG. 3. The system 300 illustrated in FIG. 3 has one input layer 321, which contains a number, which can be predetermined, of input computation elements to which the input variables $u_t$ can be applied at times t which can be predetermined, that is to say time series values which are described in the following text with predetermined time steps.

Input computation elements, that is to say input neurons, are connected via variable connections to neurons in a number, which can be predetermined, of concealed layers 305 (the illustration shows 13 concealed layers). In this case, neurons in a first concealed layer 331 are connected to neurons in the first input layer 321. The weights for the connection between the first concealed layer 331 and the first input layer 321 are contained in a first connection matrix B.

Furthermore, the neurons in the first concealed layer 331 are connected by means of their outputs to inputs of neurons in a second concealed layer 332 in accordance with a structure which is governed by a second connection matrix A. The neurons in the second concealed layer 332 are connected by means of their outputs to inputs of neurons in a third concealed layer 333 in accordance with a structure which is governed by the second connection matrix A. The neurons in the third concealed layer 333 are connected by means of their outputs to inputs of neurons in a fourth concealed layer 334 in accordance with a structure which is governed by the second connection matrix A. The neurons in the fourth concealed layer 334 are connected by means of their outputs to inputs of neurons in a fifth concealed layer 335 in accordance with a structure which is governed by the second connection matrix A. The neurons in the fifth concealed layer 335 are connected by means of their outputs to inputs of neurons in a sixth concealed layer 336 in accordance with a structure which is governed by the second connection matrix A. The neurons in the sixth concealed layer 336 are connected by means of their outputs to inputs of neurons in a seventh concealed layer 337 in accordance with a structure which is governed by the second connection matrix A. The neurons in the seventh concealed layer 337 are connected by means of their outputs to inputs of neurons in an eighth concealed layer 338 in accordance with a structure which is governed by the second connection matrix A. The neurons in the eighth concealed layer 338 are connected by means of their outputs to inputs of neurons in a ninth concealed layer 339 in accordance with a structure which is governed by the second connection matrix A. The neurons in the ninth concealed layer 339 are connected by means of their outputs to inputs of neurons in a tenth concealed layer 360 in accordance with a structure which is governed by the second connection matrix A. The neurons in the tenth concealed layer 360 are connected by means of their outputs to inputs of neurons in an eleventh concealed layer 361 in accordance with a structure which is governed by the second connection matrix A. The neurons in the eleventh concealed layer 361 are connected by means of their outputs to inputs of neurons in a twelfth concealed layer 362 in accordance with a structure which is governed by the second connection matrix A. The neurons in the twelfth concealed layer 362 are connected by means of their outputs to inputs of neurons in a thirteenth concealed layer 363 in accordance with a structure which is governed by the second connection matrix A.

In the concealed layers, the first to thirteenth concealed layers 331–339 and 360–363 are in each case "inner" states or "inner" system states $s_t$, $s_{t+1}$, ..., $s_{t+12}$ of a dynamic process described by the system, represented at thirteen successive times t, t+1, ..., t+12. The intermediate states of the dynamic process are in this case represented respectively by the second 332, third 333, fourth 334 and sixth 336, seventh 337, eighth 338 and tenth 360, eleventh 361, and twelfth 362 concealed layers. The first 331, fifth 335, ninth 339 and thirteenth 363 concealed layers respectively represent the states of the dynamic process which respectively correspond to a time step which is predetermined by the time series of the input variables. The details in the indices in the respective layers indicate the respective time t, t+1, ..., t+12 to which the signals ($u_t$) which can be tapped off at or can be supplied to the outputs of the respective layer in each case relate.

One output layer 320 has twelve partial output layers, a first partial output layer 341, a second partial output layer 342, a third partial output layer 343, a fourth partial output layer 344, a fifth partial output layer 345, a sixth partial output layer 346, a seventh partial output layer 347, an eighth partial output layer 348, a ninth partial output layer 349, a tenth partial output layer 370, an eleventh partial output layer 371 and a twelfth partial output layer 372.

Neurons in the first partial output layer 341 are connected to neurons in the second concealed layer 332 in accordance with a structure which is governed by an output connection matrix C. Neurons in the second partial output layer 342 are likewise respectively connected to neurons in the second concealed layer 332 and to neurons in the third concealed layer 333 in accordance with the structure which is governed by the output connection matrix C. Neurons in the third partial output layer 343 are respectively connected to neurons in the second concealed layer 332, to neurons in the third concealed layer 333 and to neurons in the fourth concealed layer 334 in accordance with the output connection matrix C.

This type of connection structure respectively applies in an equivalent manner to the fourth 344, the fifth 345, the sixth 346, the seventh 347, the eighth 348, the ninth 349, the tenth 370, the eleventh 371 and the twelfth 372 partial output layers. The output variables for a respective time t+1, t+2, ..., t+12 can be tapped off ($y_{t+1}$, $y_{t+2}$, ..., $y_{t12}$) at the neurons partial output layers 341–349 and 370–372.

Furthermore, in addition to the input layer 321, however, only the fourth partial output layer 344, the eighth partial output layer 348 and the twelfth partial output layer 372 are error-producing neuron layers. This means that, when the system is being trained, error signals are produced only in these neuron layers. It is thus possible to predict 12 respective subsequent states of the dynamic process which follow by a time step (three-monthly time step) which can be predetermined, and hence it is possible to predict states of the dynamic process over a long time period.

The output connection matrix C is defined in such a manner that one weight in the output connection matrix has the value unity, while the other weights in the output connection matrix C have the value zero.

The particular advantage of the system illustrated in FIG. 3, in particular by virtue of its structure, is that the system allows efficient training using only a small amount of training data. This is feasible in particular because the fact that the weights in the connection matrices A, B and C are each equal means that only a small number of weight parameters need be set, and the particular shape of the output connection matrix C results in a further simplification of the training method.

A further significant advantage of the system is that the particular structure of the system allows states of a dynamic process to be described in a narrow time frame, even though input variables which have been processed as a time series have a time frame which is coarser than that of the intermediate states (undershooting).

The time frame of the intermediate states can be further refined by using further concealed layers, each having one connected partial output layer, in a system, but with the further partial output layers not being error-producing neuron layers. In mathematical terms, an increase in the refinement of the time frame of intermediate states in a dynamic process corresponds to a change from a time-discrete description of the dynamic process to a description of the dynamic process by means of a continuous differential equation system. The procedure for training the system described above is described in S. Hayken at pages 498–533. In this case, only the error-producing neuron layers are used for training the system.

S. Hayken proposes methods and systems of computation elements which are connected to one another for determining a dynamic response on which a dynamic process is based, in which it is possible to take account in the modeling of the dynamic response of a predetermined condition, such as a smoothed profile of the dynamic process in a predetermined area, in which "inner" states of the described dynamic process are represented. The back-propagation process is used as the training method.

The following text describes a number of alternatives to the exemplary embodiment described above. The system described in the first exemplary embodiment may also be used for determining the dynamic response of an electrocardiogram (EKG). This allows indicators of an increased risk of cardiac arrest to be determined at an early stage. A time series of EKG values measured on a patient is used as the input variable.

The system described in the second exemplary embodiment can also be used to predict a macroeconomic dynamic response, such as an exchange rate profile, or other economic identification figures, such as a stock market index. For predictions such as this, an input variable is formed from time series of relevant macroeconomic or economic identification figures, such as interest rates, currencies or inflation rates. Alternatively, the following cost function may also be chosen as the overall cost function E':

$$E' = \frac{1}{T}\sum_{t=1}^{T}(y_t - y_t^d)^2 + \frac{\|s_{t+1} - s_t\| + \|s_t - s_{t-1}\|}{\|(s_{t+1} - s_t) + (s_t - s_{t-1})\|} \to \min_{f,g} \quad (7)$$

$$E' = \frac{1}{T}\sum_{t=1}^{T}(y_t - y_t^d)^2 + \frac{(s_{t+1} - s_t) \cdot (s_t - s_{t-1})}{\|s_{t+1} - s_t\| \cdot \|s_t - s_{t-1}\|} \to \min_{f,g} \quad (8)$$

Furthermore, the condition is not restricted to a smoothness condition.

This fact can advantageously be used for the prediction of macroeconomic or economic dynamic responses, since a macroeconomic or economic system is an emergent system.

Furthermore, a concealed layer whose neurons are connected both to neurons in an input layer associated with the concealed layer and to neurons in an output layer associated with the concealed layer can also. The concealed layer is connected to another concealed layer in the manner described in the exemplary embodiments. The connection matrices A, B and C each have the forms described in the exemplary embodiments.

One possible implementation of the exemplary embodiments described above may be carried out using the program SENN, Version 2.3.

What is claimed is:

1. A computer system having computation elements connected to one another to describe states of a dynamic system which follow one another in time, the dynamic system mapping an input variable onto an output variable, said computer system comprising:

at least one first subsystem with a first input computation element, receiving a time series value which describes the input variable of the dynamic system in a first state space at a first time, connected to a first intermediate computation element by which a state of the dynamic system can be described in a second state space at the first time; and at least two second subsystems each with a second intermediate computation element, by which a state of the dynamic system can be described in the second state space at a second time, connected to a first output computation element, on which an output time series value, which describes the output variable of the dynamic system at the second time, can be tapped off, corresponding second intermediate computation element and first output computation element having weights equal to one another, the at least two second subsystems being connected to one another by a coupling between the second intermediate computation elements and one second subsystem being connected to the at least one first subsystem by coupling between corresponding first and second intermediate computation elements with weights equal to one another, the first subsystem, the one of the second subsystems and at least one other second subsystem representing states of the dynamic system which follow one another in time.

2. The computer system as claimed in claim 1, wherein said at least one first subsystem includes at least two first subsystems connected by coupling between the first intermediate computation element of each.

3. The computer system as claimed in claim 2, wherein a single output computation element is used as the first output computation element and is connected to a plurality of second intermediate computation elements.

4. The computer system as claimed in claim 1, wherein a first predetermined time interval separates the first and the second times, and a second predetermined time interval separates the second time from a third time corresponding to another state of the dynamic system.

5. The computer system as claimed in claim 4, wherein the first and second predetermined time intervals are equal to each other.

6. The computer system as claimed in claim 4, wherein the second predetermined time interval is a multiple of the first predetermined time interval.

7. The computer system as claimed in claim 4, wherein at least one of the first and second predetermined time intervals is a devisor of a predetermined time series time step, defined by a time series having a time series value.

8. The computer system as claimed in claim 4, wherein a first one of the at least one first subsystem represents a present state of the dynamic system, and the second subsystems each represent a future state of the dynamic system.

9. The computer system as claimed in claim 8, wherein a second one of the at least one first subsystem represents a state of the dynamic system at a previous time, preceding the present state by a third predetermined time interval.

10. The computer system as claimed in claim 9, wherein at least some of the first and second intermediate computation elements are artificial neurons.

11. The computer system as claimed in claim 10, wherein only one weight of weights which are in each case associated with a connection between an intermediate computation element and an output computation element has a unity value, and all other weights each have the value zero.

12. The computer system as claimed in claim 11, wherein the computer system is used for determining a dynamic response of a dynamic process, with the dynamic response being described by a variation in the states of the dynamic system which follow one another in time.

13. The computer system as claimed in claim 12, further comprising a measurement system to detect physical signals, by which the dynamic process is described.

14. The computer system as claimed in claim 13, wherein the computer system is used for determining the dynamic response of the dynamic process in a chemical reactor.

15. The computer system as claimed in claim 13, wherein the computer system is used for determining the dynamic response of an electrocardiogram (EKG).

16. The computer system as claimed in claim 13, wherein the computer system is used for determining the dynamic response of an economic process.

17. A method for computer-aided determination of states of a dynamic system which follow one another in time, the dynamic system mapping an input variable onto an output variable, said method comprising:
   transforming a time series value describing the input variable of the dynamic system in a first state space at a first time into a second state space to form a first transformed time series value for the first time;
   mapping the first transformed time series value in the second state space onto a second transformed time series value at a second time;
   mapping the second transformed time series value in the second state space onto a third transformed time series value at a third time;
   transforming the second transformed time series value from the second state space to a first output time series value, describing the output variable of the dynamic system;
   transforming the third transformed time series value from the second state space to a second output time series value in the first state space, describing the output variable of the dynamic system at the third time, where the time series values for the first, second and third times represent the states of the dynamic system.

18. The method as claimed in claim 17, wherein the time series values are vectors whose dimensions can be predetermined.

19. The method as claimed in claim 18, wherein the method is used for determining a dynamic response of a dynamic system, with the dynamic response being determined from a variation in the states of the dynamic system which follow one another in time.

20. The method as claimed in claim 19, wherein the method is used for prediction of first and second future states of the dynamic system, with the time series values for the first time representing a present state of the dynamic system, the time series values for the second time describing a first future state of the dynamic system, and the time series values for the third time describing a second future state of the dynamic system, and the prediction being determined from the time series values of the second and third times.

21. A method for computer-aided training of an arrangement of computation elements connected to one another to describe states of a dynamic system which follow one another in time, the dynamic system mapping an input variable onto an output variable, the arrangement having at least one first subsystem with a first input computation element, receiving a time series value which describes the input variable of the dynamic system in a first state space at a first time, connected to a first intermediate computation element by which a state of the dynamic system can be described in a second state space at the first time; and at least two second subsystems each with a second intermediate computation element, by which a state of the dynamic system can be described in the second state space at a second time, connected to a first output computation element, on which an output time series value, which describes the output variable of the dynamic system at the second time, can be tapped off, corresponding second intermediate computation and first output computation elements having weights equal to one another, the at least two second subsystems being connected to one another by a coupling between the second intermediate computation elements and one second subsystem being connected to the at least one first subsystem by coupling between corresponding first and second intermediate computation elements with weights equal to one another, the first subsystem, the one of the second subsystems and at least one other second subsystem representing states of the dynamic system which follow one another in time, said method comprising:
   applying a first training data item as the time series value to the arrangement to be trained;
   applying second and third training data items as the output time series values to the arrangement to be trained; and
   adapting the variable weights using a training method.

* * * * *